(12) United States Patent  (10) Patent No.: US 12,479,537 B2
Miller et al.  (45) Date of Patent: Nov. 25, 2025

(54) MOORING SYSTEM AND METHOD

(71) Applicant: ORBITAL MARINE POWER LIMITED, Orkney (GB)

(72) Inventors: Calum Miller, Kirkwall (GB); David Clouston, Kirkwall (GB); Thomas Hugon, Kirkwall (GB); William Annal, Kirkwall (GB)

(73) Assignee: ORBITAL MARINE POWER LIMITED, Kirkwall (GB)

( * ) Notice: Subject to any disclaimer, the term of this patent is extended or adjusted under 35 U.S.C. 154(b) by 622 days.

(21) Appl. No.: 17/798,760

(22) PCT Filed: Feb. 4, 2021

(86) PCT No.: PCT/GB2021/050240
§ 371 (c)(1),
(2) Date: Aug. 10, 2022

(87) PCT Pub. No.: WO2021/160992
PCT Pub. Date: Aug. 19, 2021

(65) Prior Publication Data
US 2023/0110436 A1 Apr. 13, 2023

(30) Foreign Application Priority Data
Feb. 11, 2020 (GB) .................................... 2001866

(51) Int. Cl.
*B63B 21/50* (2006.01)
*B63B 21/00* (2006.01)
(Continued)

(52) U.S. Cl.
CPC .............. *B63B 21/50* (2013.01); *B63B 21/04* (2013.01); *B63B 2021/004* (2013.01); *B63B 2021/203* (2013.01)

(58) Field of Classification Search
CPC ... B63B 21/50; B63B 21/04; B63B 2021/004; B63B 2021/203; B63B 21/20; B63B 21/00; Y02E 10/30
See application file for complete search history.

(56) References Cited

U.S. PATENT DOCUMENTS 5,044,297 A 9/1991 de Baan et al.
5,240,446 A 8/1993 Boatman et al.
(Continued)

FOREIGN PATENT DOCUMENTS

CN 101287645 10/2008
CN 101730784 6/2010
(Continued)

OTHER PUBLICATIONS

International Search Report and Written Opinion for application No. PCT/GB2021/050240, dated Jul. 5, 2021.

*Primary Examiner* — Anthony D Wiest
(74) *Attorney, Agent, or Firm* — MOSER TABOADA

(57) ABSTRACT

Disclosed is a mooring system (1) for mooring a floating vessel. The mooring system includes a connector structure (10) for attachment to a mooring line and an anchor structure (20) to be anchored to a sea bed. The connector structure comprises an engagement portion (14) and an attachment portion (12). The anchor structure comprises an open guide channel (22) extending from an entrance region (24) to a terminal region (26); and sized to accommodate at least the engagement portion of the connector structure. A longitudinal opening to the guide channel provides access for a mooring line connected to the attachment portion, while the connector and anchor structures are connected and disconnected. Connection and disconnection can be controlled from the water surface.

20 Claims, 4 Drawing Sheets

(51) Int. Cl.
*B63B 21/04* (2006.01)
*B63B 21/20* (2006.01)

(56) References Cited

U.S. PATENT DOCUMENTS

| | | |
|---|---|---|
| 5,356,321 A | 10/1994 | Boatman et al. |
| 2004/0094082 A1 | 5/2004 | Boatman et al. |

FOREIGN PATENT DOCUMENTS

| | | |
|---|---|---|
| CN | 102438888 | 5/2012 |
| JP | S60 240594 A | 11/1985 |
| WO | WO 2012032163 | 3/2012 |
| WO | WO 2018/197882 A1 | 11/2018 |
| WO | WO 2019/078725 A1 | 4/2019 |

MOORING SYSTEM AND METHOD

FIELD OF THE INVENTION

The invention relates to a mooring system for mooring a vessel, in particular a permanently or semi-permanently located vessel such as an offshore renewable energy facility, in particular a tidal turbine, and to a method of remotely engaging and releasing a mooring line.

BACKGROUND TO THE INVENTION

Offshore installations such as renewable energy generating facilities, or oil and gas production facilities, may include floating vessels which are permanently or semi-permanently anchored at the facility (i.e. for months or years at a time).

The mooring lines for such vessels are required to resist forces applied to the floating vessel due to tides, waves and surface conditions which act to move the floating vessels.

Subsea conditions can degrade mooring lines, particularly in the marine environment, and regular inspection and maintenance (including replacement) is essential.

Conventional disconnectable anchoring systems, such as those described in EP1882106 or EP2800685, are adapted to be connected and disconnected using remotely operated vehicles (ROVs). Conventional systems may also be engineered to meet requirements specific to particular applications, such as rotation around an axis and/or to be releasable above a predefined load, as might be required in particular oil and gas production applications. A further example is described in JPS60240594, in which a socket at the end of a cable can be received through a slotted opening in an upstanding tube anchored to a sea bed and retained in the closed upper end of the tube by tension in the cable. A problem of this arrangement is that installation requires accurate positioning of the cable and socket and the cable and socket is prone to be removed from the tube unless sufficient tension on the cable is maintained.

There remains a need to reduce the operational complexity and associated costs (e.g. to deploy ROVs) of disconnectable anchor systems.

SUMMARY OF THE INVENTION

According to a first aspect of the invention there is provided a mooring system for mooring a floating vessel, comprising:
- a connector structure comprising an attachment portion for attaching to a mooring line, and an engagement portion; and
- an anchor structure configured to be anchored to a sea bed;
- wherein the anchor structure comprises an open guide channel extending from an entrance region to a terminal region; and sized to accommodate at least the engagement portion of the connector structure;
- wherein a longitudinal opening extends upwardly from the open guide channel, providing access for a mooring line connected to the attachment portion when the engagement portion is in the guide channel;
- wherein, when the engagement portion is engaged with the terminal region of the guide channel;
- at least the terminal region is configured to support the connector structure, and the engagement portion is retained by the terminal region against movement of the engagement portion out of the guide channel upward or away from the entrance region.

The connector structure is moved along the guide channel, via the entrance region, to the terminal region, to connect the connector structure the anchor structure. The upper opening of the guide channel provides for such movement to be conducted whilst the connector structure is attached to a mooring line.

When the engagement portion of the connector structure engages with the terminal region at the end of the guide channel, the connector structure can only be removed from the guide channel in the reverse direction, towards the entrance region. Further movement of the engagement portion away from the entrance region, or upward out of the guide channel, is prevented.

A moored vessel, (such as permanently or semi-permanently moored vessels) may be moored via one or more mooring lines extending to an anchor or anchors positioned on the sea bed at a distance away from the vessel; i.e. not directly below the vessel. A mooring line is provided with a degree of slack, to allow for limited movement of a moored vessel at the surface (to allow for tides, swell and the like). At the sea bed, forces applied to an anchor via the mooring line are generally along the sea bed or, if the vessel moves away from the anchor, forces at an angle to the sea bed may be applied. The mooring system can be oriented in relation to the mooring line so that engagement between the engagement portion and the terminal region prevents the connector structure from being disengaged from the anchor structure.

The terminal region is also configured to support (i.e. support the weight of) at least the engagement portion of the connector structure, such that the engagement portion of the connector structure will remain in the terminal region unless urged towards the entrance portion. Accordingly, in use, the connector portion remains coupled to the anchor structure even when a mooring line attached thereto is slack. This is of particular benefit in tidal locations, where current may cause large variations in the position of a moored vessel.

It will be understood that the terminal region is configured to provide such support to the engagement portion when the anchor section is in an orientation located on a generally level sea bed.

In some embodiments, the at least the engagement portion of the connector structure is retained by the terminal region against movement of the engagement portion upward or away from the entrance region, in relation to the anchor structure.

The mooring system contrasts with conventional disconnectable moorings or anchors in that connection may be established while a portion of the mooring line connector, or the mooring line itself, extends out of the guide channel. Since the mooring line connector can be connected in this way, in some embodiments solely via a mooring line from the water surface, expensive deployment methods (such as using ROVs) are not required.

In turn, ease of connection and disconnection from the surface may provide for the use of smaller mooring lines having shorter working lifetimes.

When the engagement portion is engaged in the terminal region of the guide channel, the attachment portion may be attached to a mooring line extending generally upwards (in relation to the sea bed). Such access between the mooring line and the connector structure is provided by the longitudinal opening.

The longitudinal opening may extend from the guide channel distally of the terminal region. When engaged with the terminal region, the connector structure may accordingly be connected to a mooring line extending generally along the sea bed distally from the terminal region and/or at an angle upwards and distally.

Reference herein to "proximal" and "distal" and similar terms are made from the frame of reference in a direction along the guide channel from the entrance region to the terminal region.

At least a portion of the guide channel, such as the terminal region and/or a portion of the guide channel extending therefrom, may extend generally horizontally. Thus, in use, the engagement portion may be moved generally horizontally along said at least a portion of the guide channel, in use.

The guide channel may be defined by suitably oriented surface regions. Each said surface region may comprise a single surface, or multiple surfaces. A surface region may be defined by a network of surface, such as by a tubular construction.

The guide channel may be defined at least in part defined by side surface regions, which may be oriented generally towards one another.

The guide channel may comprise a base surface region oriented generally upwards, for example at least in the terminal region.

The base surface region may extend entirely across the guide channel along all or a part of the channel. The base surface region may extend partly across the guide channel, along all or a part of the channel.

The base surface region may extend between the side surface regions, along at least a part of the guide channel.

The longitudinal opening may extend between the side surface regions, along the guide channel and optionally distally of the terminal region thereof.

In the terminal region, the base surface region may extend to one or both sides (i.e. laterally of) the longitudinal opening. In some embodiments, the base surface region extends between the side surface regions in the entrance region of the guide channel and, in the terminal region of the guide channel, the base surface region may extend from the side surface regions and to either side of the longitudinal opening.

A vertical longitudinal plane of symmetry may extend along the guide channel and the guide channel and optionally the anchor structure as a whole may be symmetrical around the longitudinal plane.

The entrance region of the guide channel may be configured such that the engagement portion of the connector structure may be lowered into the guide channel.

The entrance region of the guide channel may be configured such that the engagement portion be lowered to adjacent the entrance region and then moved generally horizontally (distally) into the guide channel.

At least the entrance region of the guide channel may comprise a ramp. The ramp may be defined by a part of the base surface region.

The ramp may be oriented to direct the engagement portion, when lowered into the entrance region and onto the ramp, distally along the guide channel towards the terminal region.

The ramp may be at an angle to horizontal, such as between around 40° and 80°, or between around 50° and 70°, or around 45°, 50°, 66°, 60° or 65°.

The ramp may have a flat profile, or may be curved (e.g. parabolic).

A ramped entrance region may extend to a level region (i.e. extending generally along the sea bed). The level region of the guide channel may comprise the terminal region.

The transition between the ramped entrance region and the level region, optionally a level terminal region, may be sudden (i.e. comprising a corner) or may be gradual (i.e. comprising a smooth transition from ramped to level).

In some embodiments, the terminal region (and/or any intermediate region) of the guide channel may be ramped (at the same or different angles). The entire guide channel may be ramped.

The slope of the ramp of each region of the guide channel that is ramped may be constant, or may vary. For example, a ramp may be curved, in a direction longitudinally along the guide channel.

The entrance region may be configured to receive the engagement portion from within a range of approach trajectories.

A range of trajectories in the longitudinal plane may be accommodated by a ramped entrance region, as disclosed herein, extending between parts of the side surface regions. The entrance region may thus be tapered towards the base surface region, as viewed through a vertical plane. The engagement portion of the connector structure can therefore approach the entrance region from within a longitudinal range of trajectories between a trajectory extending proximally from the ramp, and a trajectory extending vertically from the distal most part of the entrance region (typically coincident with the proximal most part of the terminal region).

The uppermost part of the entrance region may extend further in a longitudinal plane than the engagement portion. Thus, a range of angles (in relation to the longitudinal plane) between the engagement portion and entrance region may also be accommodated.

A range of lateral trajectories in relation to the longitudinal plane of symmetry may be accommodated by a laterally tapered entrance region. For example, parts of the side surface regions defining the entrance region, and may converge distally along the guide channel.

The entrance region may be formed generally as an open funnel or a chute, tapering distally towards the terminal region of the guide channel.

An intermediate region and/or the terminal region may be tapered, for example the side surface regions thereof may be tapered. The tapering of the entrance region may continue towards the terminal region. The guide channel as a whole may be tapered.

The terminal region of the guide channel may be defined a distal part of the base surface region and by distal parts of each side surface region.

The terminal region may comprise at least one receiving formation for receiving and engaging with the engagement portion of the connector structure (for example with engagement formations as disclosed herein).

The distal part of at least one side surface region may define a receiving formation.

The distal part of each side surface region may define a receiving formation. The receiving formations are conveniently the same as one another. The anchor structure may comprise one or more further receiving formations across the distal end of the guide channel.

The receiving formations may be configured to cooperatively engage with the engagement portion.

The or each of the receiving formations may take the form of squared or rounded recesses, longitudinal slots or the like, at each side of the guide channel. In use, the engagement portion of the connector structure may abut the or each receiving formation to prevent further motion distally and the or each receiving formation may extend over at least a part of the engagement portion, to prevent upward movement thereof in relation to the anchor structure. The connector structure is thereby retained by the terminal region against movement of the engagement portion upward or away from the entrance region, in relation to the anchor structure.

The anchor structure may comprise a guide section, defining the guide channel. The anchor structure may comprise a base section, adapted to be secured to the sea bed.

The anchor structure may be adapted to be ballasted.

The anchor structure may comprise a location suitable for resting or securing ballast weights thereto.

The at least a part of the anchor structure may be of hollow construction, and be adapted to be filled with a ballasting material.

At least a part of the anchor structure may be machined or cast from a block of a ballasting material, such as a metal block. For example, one or more portions of the anchor structure defining the guide channel may be machined or cast from a ballasting material.

The anchor structure (such as a base section thereof) may further comprise a fluke, for securing the anchor structure to the sea bed. Alternatively, or in addition, screws, pilings or the like may be used to secure the anchor structure to the sea bed.

The anchor structure may be of any suitable construction. For example at least a part of the anchor structure may be constructed from girders, tubulars, bars or beams, etc.

The anchor structure may be adapted to provide a stable, and in some embodiments generally flat, platform on the sea bed. A base section may for example comprise one or more elongate beams, wherein the guide section is mounted thereon. The guide section may be attached directly to the base section, or spaced apart therefrom by a supporting framework.

The guide section may be of unitary construction, hollow construction, or itself constructed from a framework of beams, bars, tubulars or the like. The guide channel may be defined by one or more guide surfaces, or by surfaces of a said framework.

One or more portions of the anchor structure may be of hollow construction, for receiving ballasting material as disclosed herein.

The engagement portion of the connector structure may comprise engagement formation, corresponding to a said receiving formation. The engagement formation may be configured to cooperatively engage with said receiving formation.

The engagement portion may comprise an engagement formation extending laterally therefrom, to engage with a receiving formation defined by the or each side surface region.

In embodiments wherein the guide channel is laterally symmetrical (about the longitudinal plane of symmetry), the connector structure may be laterally symmetrical around its own longitudinal plane, the longitudinal planes of the guide channel and connector structure being coincident when the anchor and connector structures are engaged with one another.

A laterally extending engagement formation may comprise a peg, or other suitable protrusion. A laterally extending engagement formation may comprise a rotatable element, rotatable for example around an axis normal to the longitudinal plane. A laterally extending engagement formation may, for example, comprise an axle and a bushing or bearing around the axle.

A rotatable element such as a bushing or a bearing may assist when moving the engagement portion along the guide channel. Over time, movement caused by varying tension applied to the mooring line (e.g. in tide or swell) may be facilitated by rotation of the connector structure around the rotatable engagement formations, reducing interfacial wear.

The attachment portion may include any suitable means for connecting to a mooring line, such as a simple eyelet, or more than one eyelet. The attachment portion may be adapted to facilitate lateral and/or vertical motion of the mooring line attached thereto.

For example, the attachment portion may comprise a universal joint, one or more H-plates (optionally having eyelets orthogonal to one another, at the ends thereof) or other suitable means for attaching a mooring line.

The attachment portion may be symmetrically disposed in relation to said longitudinal plane extending through the connector structure. Such symmetry may assist in balancing and orienting the connector structure during connection and disconnection from the anchor structure.

The connector structure may comprise a generally triangular arrangement between the attachment portion and engagement formations.

The connector structure may comprise one or more further connectors, for connecting a lifting line. The lifting line connectors may be releasable. The connectors may be remotely releasable.

Any suitable arrangement for remove disconnection of a lifting line can be used, for example controlled by a control line, which may be deployed together with the lifting line. For example, a lifting line could be released via a hydraulically actuated pin, powered via one or more hydraulic control lines. A lifting line could comprise a remotely releasable hook, controlled by a pull line. In some embodiments, a lifting line may be configured as a so-called "endless line", and may be secured around the connector structure or an eyelet thereon, and looped back up to the surface.

Reconnection can in some embodiments be established remotely be analogous means. In use, the connector structure may be connected to a lifting line and lowered through the water column into the entrance region. The connector structure may also, or alternatively connected to a mooring line for this purpose. Alternatively, the lifting line may be used principally to control position of the connector structure in the water column, and the mooring line used for additional control to guide the engagement portion along the guide channel.

A dedicated guide line (optionally of lighter construction than the mooring line) may also be employed for connection to the connector structure at or proximal to the attachment portion. The mooring system may comprise a lid structure, sized to be positioned in and block the entrance portion of the guide channel. The lid structure may extend entirely across the guide channel.

A lid structure may optionally be placed in the entrance portion of the guide channel to alleviate fouling (for example build up of silt or marine life) on said surface regions defining the guide channel. A lid structure may also resist motion of the engagement portion proximally towards the entrance portion of the guide channel, in use. The lid structure may prevent or resist movement of the engagement portion away from the terminal region of the guide channel.

The lid structure may be of any suitable construction, but is conveniently of hollow of solid construction so as to most effectively protect the entrance portion from fouling. The lid structure may be ballasted, or adapted to be ballasted. On an upper part of the lid structure may be provided a connector (which may be releasable, optionally remotely), by which the lid structure may be raised and lowered, in use.

The mooring system may comprise a mooring line, attached to the attachment portion of the connector structure. The mooring line may be a braided cable, chain or the like.

The mooring system may comprise a lifting line, for connection to the connector structure. The lifting line may be a braided cable, a chain or the like.

A mooring line may be of comparatively heavy construction, to withstand forces applied to a moored vessel. A lifting line by comparison may be of lighter construction than a mooring line, and in some embodiments movement of the connector structure may be more easily controlled using a lighter weight lifting line. Similar considerations apply to lifting lines used to move the lid structure or to deploy the anchor structure, ballast etc., as discussed in further detail below.

The mooring system may comprise such surface apparatus as are required to raise and lower the anchor structure, connector structure and, where present, lid structure. The surface apparatus may comprise a mechanical winch. The surface apparatus may comprise one or more vessels and/or one or more floats, for use in moving any applying forces to the mooring line and/or any guide lines of lifting lines.

According to a second aspect of the invention there is provided a method of connecting a mooring line to the sea bed, the method comprising:
  providing a connector structure having an attachment portion attached to a mooring line, and an engagement portion; and an anchor structure anchored to a sea bed, wherein the anchor structure comprises an open guide channel sized to accommodate at least the engagement portion of the connector structure, and the longitudinal opening extends upwardly from the open guide channel;
  lowering the engagement portion of the connector structure into an entrance region of the guide channel, or lowering the engagement portion adjacent to an entrance region of the guide channel and moving the engagement portion generally horizontally into the entrance region;
  moving the engagement portion distally along the guide channel from the entrance region to a terminal region of the guide channel;
  engaging the engagement portion of the connector structure with the terminal portion of the guide channel such that the terminal portion retains the engagement portion against movement of the engagement portion upward or away from the entrance region; and is configured to support the connector structure; and
  extending the mooring line from the attachment portion in a direction in relation to the guide channel generally upwardly or distally away from the entrance region.

It will be understood that the engagement portion is moved distally along the guide channel from the entrance region to a terminal region of the guide channel while the mooring line is connected to the attachment portion. The longitudinal opening provides access for the mooring line to remain connected to the attachment portion during the entirety of the method. The mooring line may for example be required to be moved so as to cause the connector structure to pivot; and the longitudinal opening to the guide channel provides such access.

When the mooring line extends in a direction generally distally away from the entrance region, tension is applied via the mooring line generally along the sea bed, and acts to retain the connector structure in engagement with the anchor structure.

It will be understood that a range of directions are encompassed by the term "direction generally distally away from the entrance region", providing that a major component of forces applied between the connector and anchor structures act to retain them in engagement with one another. If a vessel to which the mooring line extends moves on the water surface, an upward component of force may be applied via the mooring line. The engagement between the engagement portion and terminal region of the guide channel prevents the connector structure from being removed from the guide channel.

The method may comprise moving the engagement portion generally horizontally along at least a portion of the guide channel. For example, the engagement portion may be moved generally horizontally into engagement with the terminal region, and/or the engagement portion may be directed along a ramped entrance portion to a generally horizontal portion of the guide channel, as disclosed herein.

The method may comprise lowering the connector structure through the water column. The connector structure may be lowered through the water column suspended, at least in part, from the mooring line. The connector structure may be lowered through the water column suspended, at least in part, from a lifting line. The method may comprise attaching a lifting line to the connector structure (via one or more connectors as disclosed herein).

Movement of the engagement portion into the entrance region and along the guide channel to the terminal region may be affected by way of the mooring line and/or, where present, the lifting line.

In some embodiments, a guide line may also be connected to the connector structure (optionally at the surface) and movement of the connector structure through the water column, into the entrance region and/or along the guide channel may be guided at least in part by the guide line.

The movement of the connector structure through the water column, into the entrance region and/or along the guide channel to the terminal region may be controlled from at or above the water surface.

The method may comprise deploying and/or withdrawing said mooring line, lifting line and/or guide line, and thereby perform one or more steps of the method. The method may comprise moving a vessel on the water surface so as to apply forces to the said mooring line, lifting line and/or guide line, and thereby perform one or more steps of the method. The method may comprise pulling or dragging the connector portion via the mooring line, guide line and or lifting line.

While moving the connector structure into the entrance region and/or along the guide channel to the terminal region, one or more of the mooring line, lifting line and/or guide line may be attached or connected to the connector structure via the longitudinal opening.

While moving the connector structure into the entrance region and/or along the guide channel to the terminal region, one or more of the mooring line, lifting line, guide line and/or the attachment portion may extend through the longitudinal opening.

The steps comprising moving the connector portion not comprise the use of an ROV and/or diving personnel.

The mooring line may be extended distally away from the entrance region before, during or after movement of the engagement portion along the guide channel.

The method may comprise laying at least a length of the mooring line along the sea bed.

The longitudinal opening may comprise extend from the guide channel distally of the terminal region, and the method may comprise extending the mooring line from the attachment portion generally horizontally, such as along the sea bed.

The method may comprise lowering the engagement portion onto a ramped entrance region, and wherein the ramp deflects the engagement portion towards the terminal region of the guide channel.

The method may comprise connecting the mooring line to the attachment portion (by any suitable means) above the water surface.

The method may comprise anchoring the anchor structure on the sea bed. Anchoring may be performed by one or more of ballasting (e.g. placing a ballast weight on the anchor structure), drilling pilings into the sea bed, digging a fluke into the sea bed, or any other suitable method of anchoring known in the art.

The method may comprise lowering the anchor structure through the water column, for example by a lifting line.

The method may comprise disconnecting a lifting line from the connector structure and/or anchor structure. Such disconnection may be achieved by letting out the lifting line to introduce slack and thereby "unhook" the lifting line from a connector or connectors, by use of a control line, or by way of an endless line, etc.

The guide channel may comprise a vertical longitudinal plane of symmetry. The method may comprise moving the engagement portion into the entrance region along a trajectory within a range of lateral trajectories away from the longitudinal plane. The method may comprise contacting the engagement portion with a tapered entrance region of the guide channel, wherein the engagement portion slides against or rolls along the tapered entrance region and is thereby guided towards the terminal region.

The method may comprise inserting a lid structure into the entrance region.

The method may comprise removing a said lid structure from the entrance region, so as to allow the engagement portion to be subsequently moved into the entrance region.

The lid structure may be inserted and/or removed using a lifting line.

The method may accordingly comprise connecting to and/or disconnecting a lifting line from the lid structure. In embodiments wherein a lifting line is used in relation to the connector structure, the same, or a different lifting line may be used in relation to the lid structure.

Connection and/or disconnection of the lifting line may be performed at the surface, on the sea bed. Disconnection and/or connection of the lifting line to/from the lid structure at the sea bed may be controlled from the surface.

The method may comprise use of the mooring system of the first aspect.

The method may comprise mooring a vessel, such as a floating power generating apparatus as described in WO 2018/115806. The method may comprise connecting a proximal end of the mooring line to the vessel. This may be conducted before lowering the connector structure through the water column, or after (for example after the connector structure has been engaged with the anchor structure). The proximal end of the mooring line may for example be transferred from a deployment vessel for deploying the mooring system, to the vessel to be moored.

The method may comprise connecting more than one mooring line, for example more than one mooring line extending from a single vessel.

According to a third aspect of the invention there is provided a method of disconnecting a mooring line. Disconnection of the mooring line may comprise conducting the steps of method of the second aspect in reverse order.

The method of disconnecting a mooring line may comprise:
  providing a connector structure having an attachment portion attached to a mooring line, and an engagement portion; and an anchor structure anchored to a sea bed, wherein the anchor structure comprises an open guide channel having a the longitudinal opening extending upwardly from the open guide channel;
  wherein the engagement portion is engaged with a terminal region of the guide channel and the mooring line extends from the attachment portion in a direction in relation to the guide channel generally distally away from an entrance region of the guide channel;
  wherein the method comprises moving the engagement portion proximally along the guide channel from the terminal region to the entrance region of the guide channel; and
  lifting the engagement portion of the connector structure out of the entrance region of the guide channel, or moving the engagement portion generally horizontally out of the entrance region.

In some embodiments the method comprises disconnecting the connector structure from the anchor structure while the mooring line extends generally distally away from the entrance region. For example, the method may comprise connecting a lifting line to the connector structure and moving the connector structure proximally away from the terminal region and out of the entrance region.

In some embodiments the method may comprise moving the mooring line so that it extends generally upward and/or proximally towards the entrance region.

The method may comprise moving the connector structure proximally away from the terminal region and out of the entrance region, at least partially by pulling the mooring line. Alternatively, or in addition, a lifting line and/or guide line may be used.

The present invention is not limited to marine applications and is also of utility in any body of water, including lakes, rivers estuaries and the like. Accordingly references herein to a "sea bed" should be considered to apply to the bed of any such body of water and are thus interchangeable with "river bed", "lake bed" etc.

Terms such as "above", "below", "horizontal", "vertical", "along", "to the side of", "level", "lateral" or "laterally" refer to orientations when the anchor section is at rest on a level sea bed, and should not be construed so as to exclude such features in relation to other orientations of the anchor. It should be understood that in use, the orientation of the anchor structure may differ from horizontal due to slopes, debris or other features of the sea bed.

It is intended that optional features disclosed herein in relation to on aspect of the invention correspond to optional features of any other aspect of the invention. Disclosures herein relating to the function, construction or use of features of apparatus should accordingly be understood to correspond to steps of a method as disclosed herein, and disclosures herein relating to a method should be understood to also encompass apparatus having such features required to carry out such a method.

DESCRIPTION OF THE DRAWINGS

Non-limiting example embodiments will now be described with reference to the following figures in which.

DETAILED DESCRIPTION OF EXAMPLE EMBODIMENTS

Figure 1:
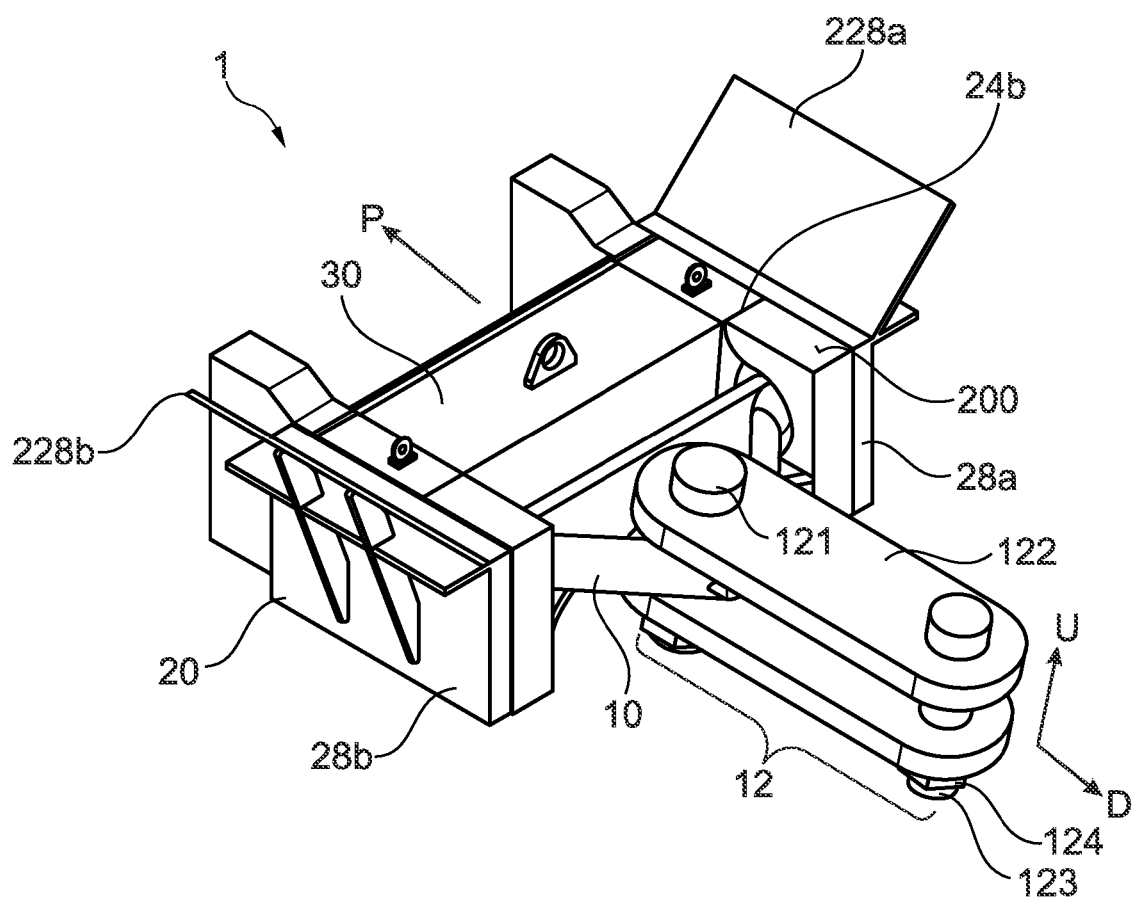
FIG. 1 is a perspective view of a mooring system.
Figure 2:
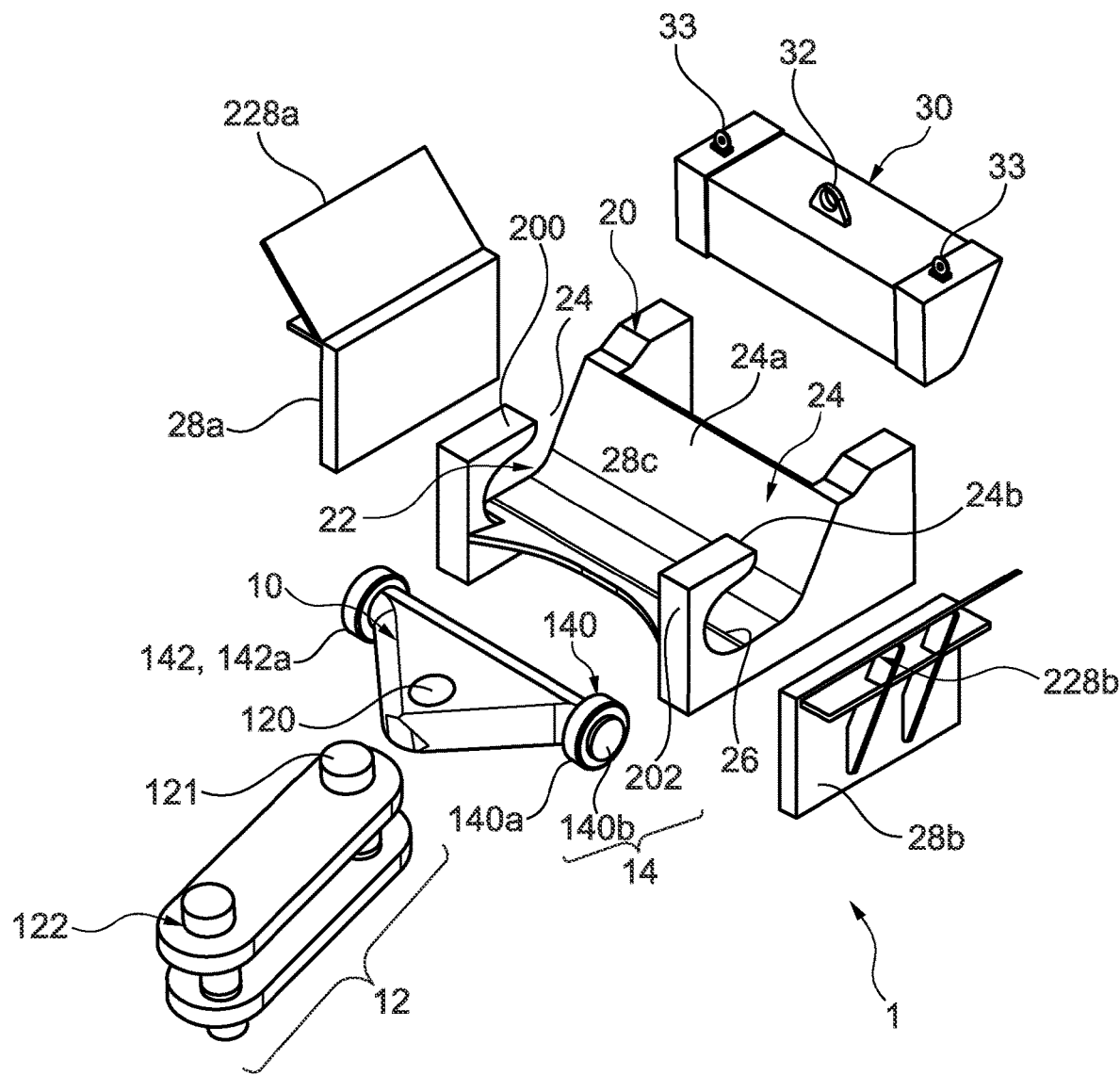
FIG. 2 is an exploded perspective view of a mooring system.
Figure 3:
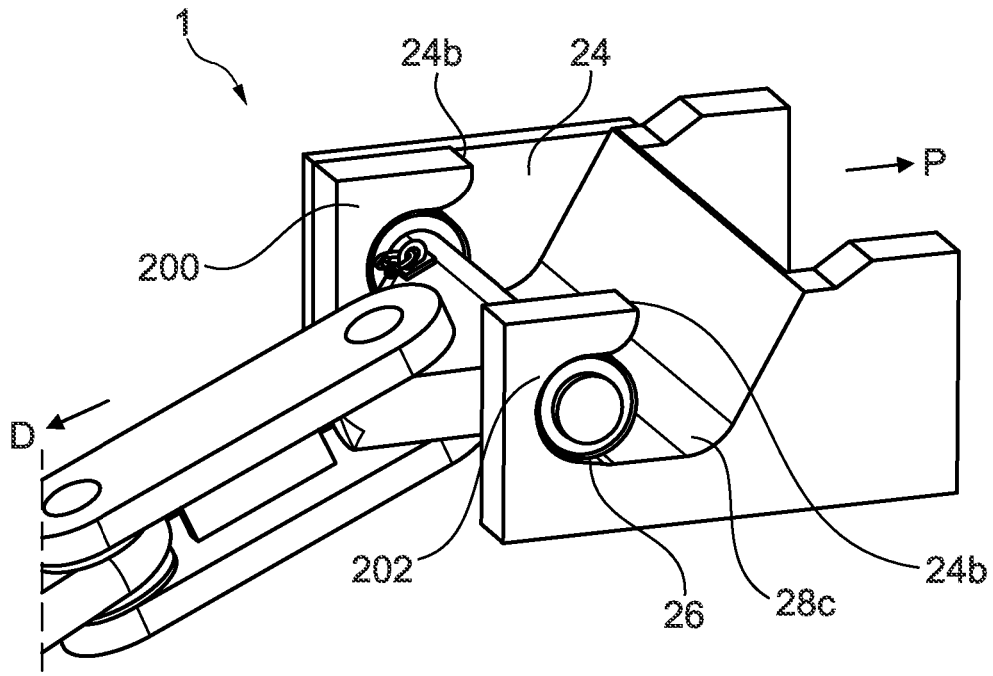
FIG. 3 is perspective cross sectional view of the mooring system without a lid structure is inserted into the entrance region of the guide channel.
Figure 4:
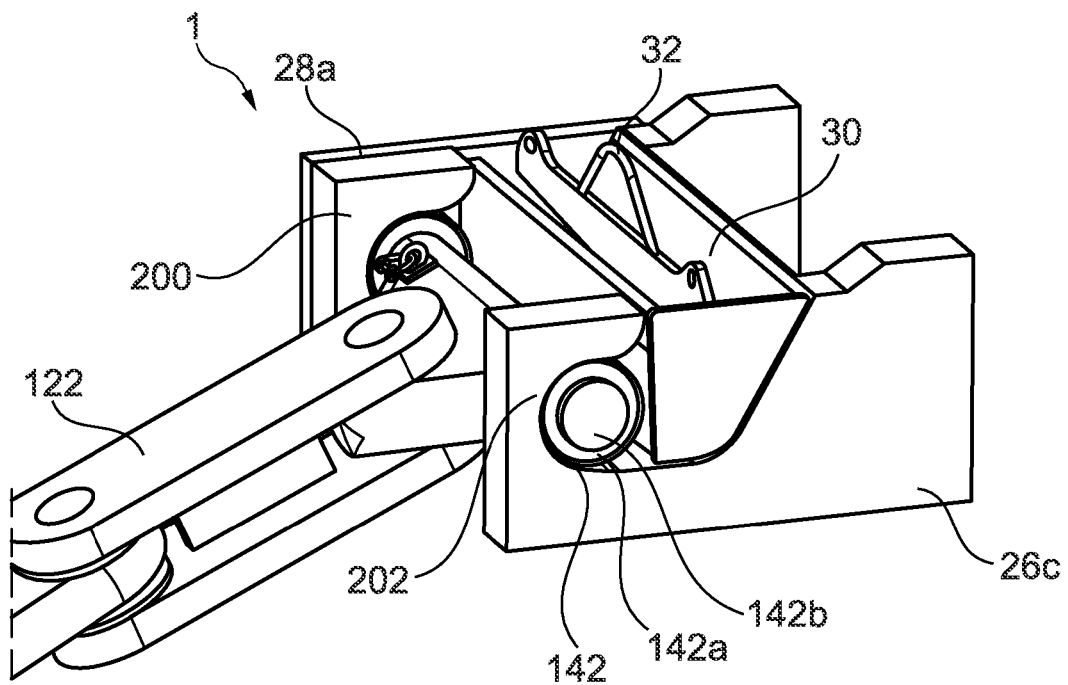
FIG. 4 shows perspective cross sectional view of the mooring system the mooring with a lid structure inserted into the entrance region of the guide channel.

FIGS. 1 to 4 show an embodiment of a mooring system 1. The mooring system includes a connector structure 10 and an anchor structure 20 which rests on the sea bed in use. The system also includes a lid structure 30, which will be discussed in further detail below.

The anchor structure 20 defines a guide channel, indicated generally as 22, which extends from an entrance region 24, to a terminal region 26. The terminal region includes receiving formations in the form of recesses or hooks 200, 202 which retain the connector structure, as discussed in further detail below.

The sides of the channel are defined by side plates 28a and 28b. The base surface region of the guide channel 22 (including the ramped surface 24a at the entrance region 24) is defined by a cast block 28c in the embodiment shown, to provide ballast to the anchor structure.

The side plates 28a and 28b also include optional tapered projections 228a and 228b, which assist in guiding the connector structure towards the entrance region and into engagement with the anchor structure in use.

In alternative embodiments, separate ballast may be used, the entire anchor structure, or those parts defining the channel, can be cast or otherwise formed from a single block, or hollow, tubular, girder or indeed any other suitable form of construction may be used. In still further embodiments, the receiving formations may be integral to the side plates.

The guide channel 22 is open along its upper side from the entrance region 24 to the terminal region 26, between the side plates and receiving formations. The upper opening of the guide channel also extends in the embodiment shown distally of the terminal region, and is occupied in FIGS. 1, 3 and 4 by a mooring line attachment portion (discussed below).

The connector structure 10 includes an attachment portion 12 towards one end thereof, and an engagement portion 14 towards the other end thereof. In common with the anchor structure 20, the connector structure shown is symmetrical about a longitudinal plane.

The guide channel 22 is sized to accommodate the engagement portion 14. When the engagement portion is engaged in the terminal region 26 of the guide channel 22, is it prevented from moving further in a distal direction D, or upwards U, out of the guide channel. The terminal region 26 is also configured (in the embodiment shown, by virtue of the upward orientation of base surface regions thereof) to support the weight of the engagement portion. Thus, absent any forces applied to the connector structure 10, the engagement portion will remain so engaged.

The engagement portion 14 includes two engagement formations 140 and 142 extending laterally therefrom. The engagement formations are sized to cooperatively engage with the respective receiving formation 200, 202. Since the connector structure and anchor structure are symmetrical, either engagement formation can engage with either receiving formation.

The engagement formations 140, 142 each comprise a central pin or axis 140b, 142b around which a rotatable member 140a, 142a (in the form of bearings or bushings). The rotatable members 140a, 142a allow the connector portion to rotate when engaged in the terminal region of the guide channel without causing undue wear. Such movement is typically caused by connection to a mooring line in use.

The attachment portion 12 includes means to attach a mooring line, such as a mooring chain, to the connector structure. The connector structure 10 is provided with an eyelet 120 through which is secured a pin 121 of an H-plate 122. This arrangement provides for lateral movement of the mooring chain (not shown) with respect to the connector portion, in use, thereby reducing lateral forces and thus movement of the connector portion.

The mooring system 1 further includes a lid structure 30 sized to be received in and block the entrance region 24 of the guide channel 22. In the embodiment shown, the lid structure 30 advantageously extends across the entire base surface region extending between the sides of the guide channel to block the entrance region 24, to prevent build up of marine organisms, silting or other fouling of the guide channel; which might otherwise hinder connection or disconnection of the connector structure from the anchor structure. The lid structure also prevents or resists movement of the engagement portion away from the terminal region of the guide channel. The lid structure is provided with connector eyelets 32, 33 for lifting and/or guiding the lid structure using a lifting or guiding line.

The mooring system 1 may be used to connect a mooring line 40 to the sea bed. At the surface, the mooring line 40 can be connected to the attachment portion 12 of the connector structure 10, in a conventional fashion such as passing a pin 123 and bolt 124 connection at the end of the H-plate 122 of the connector structure through a link in an mooring chain or a terminal loop in a mooring cable.

Figure 5:
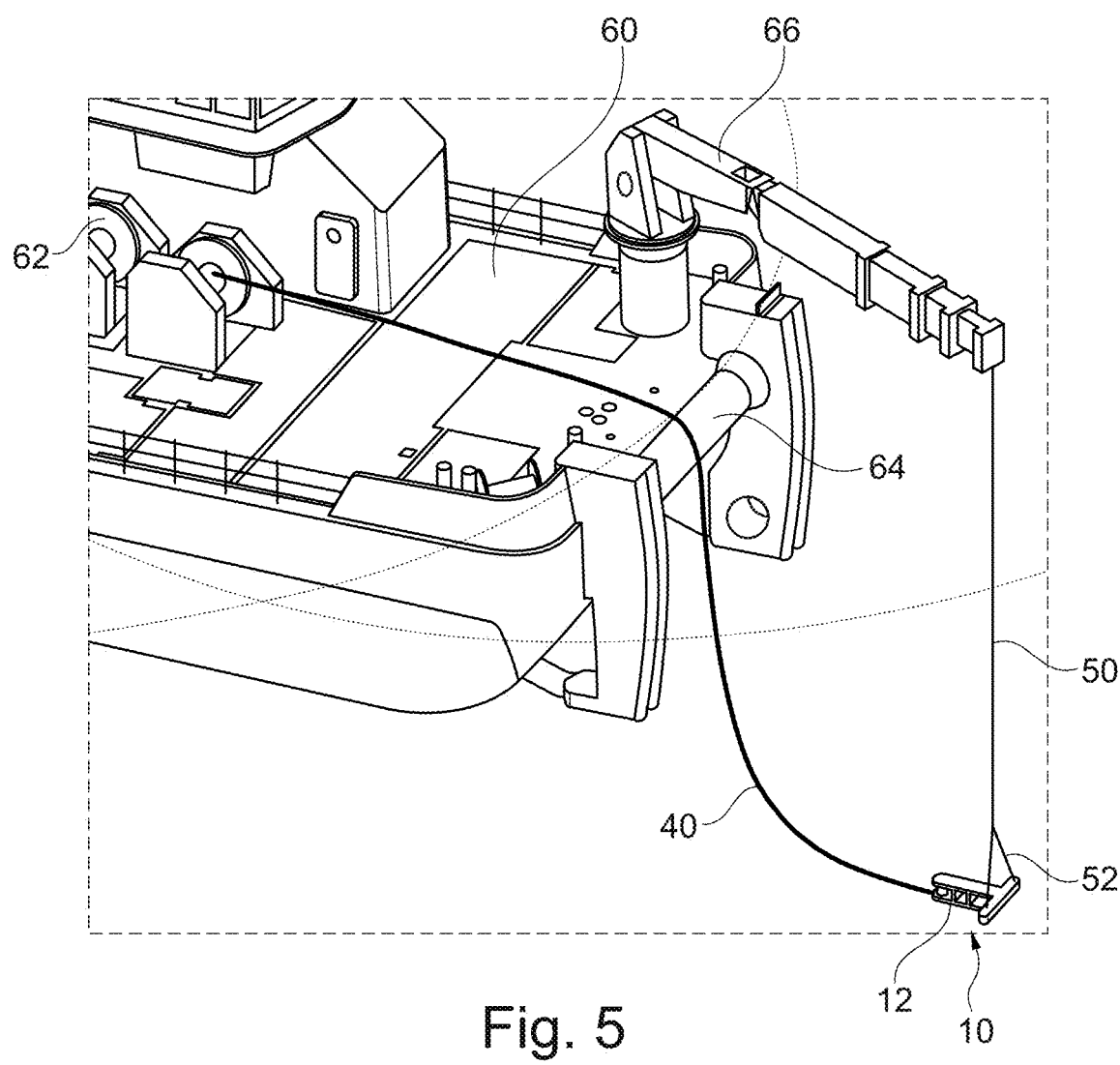
FIG. 5 shows a vessel during deployment of the mooring system.

With reference to FIG. 5, a lighter-weight lifting line 50 may be secured to the connector structure 10. A bridal 52 at the end of the lifting line may be connected to releasable connectors such as hooks or eyelets proximate to the engagement portion 14 of the connector structure 10. The bridal 52 may alternatively be looped around the laterally extending engagement formations 140, 142.

The connector portion can then be lowered through the water column from a vessel 60. In the embodiment shown this is a deployment vessel, having a winch 62 and roller 64 for letting out the mooring line 40. A crane 66 includes a corresponding winch (not shown) for letting out the lifting line 50. The crane is rotatable and extendable, so as to effect control over the position of the connector structure 10 as discussed below.

The engagement portion 14 of the connector structure 10 is then lowered into the entrance region 24 of the guide channel 22. The ramped surface 24a of the entrance region 24 is angled so as to deflect the engagement portion 14 along the ramped surface, generally downwards and laterally towards the terminal region 26 of the guide channel.

The distal end of the entrance region 24b, extending down from a line between the proximal ends of the terminal region, and the ramped surface 24a are tapered with respect to one another and, at the upper end of the entrance region (i.e. in the embodiment shown level with the top of the block 28c) is larger in the longitudinal plane than the engagement portion 14. The entrance region is thereby configured to receive the engagement portion from with a range of trajectories in the longitudinal plane and/or a range of relative angles between the engagement portion and the entrance region.

The tapered protections 228a and 228b of the side plates 28a and 28b also assist in deflecting the engagement portion towards the entrance region, when it is lowered along a trajectory laterally offset from the longitudinal plane of symmetry of the guide channel.

The longitudinal opening along the guide channel enables the engagement portion 14 enter the guide channel and be moved along to the terminal region 26 thereof, while the attachment portion 12 is connected to the mooring line 40. In the embodiment shown, the longitudinal channel is wide enough to allow the H-plate 122 and the parts of the connector structure 10 around the eyelet 120 to extend at least partially into or through the longitudinal opening at a range of orientations from generally vertical (in relation to the engagement portion) to generally horizontal along the sea bed, as shown in the figures.

The connector structure may be deployed from the stern of a vessel 60 as shown in FIG. 5, and the mooring line 40 let out, or pulled in, as required to effect some control over the position of the connector structure 10 and, at least to some extent assist to guide the engagement portion 12 along the guide channel 22 to the terminal portion 26.

Alternatively a further guide line can also be used (not shown).

Once the engagement formations 140, 142 have been moved into engagement with the receiving formations 200, 202 at the terminal region 26 of the guide channel 22, the lifting line 50 can be released, for example by releasing a hydraulically actuated pin, such as of a Hydraulic Release Shackle (HRS) manufactured by LM Handling of Camborne, UK. The hydraulic pin mechanism, hydraulic control line and associated equipment are not shown in the figures.

In a final step, the lid structure 30 can be lowered into the entrance region 24 using the same, or another, lifting line. As can be seen by comparing FIGS. 3 and 4 (which show side views without the side plate 28b, such that the profile of the guide channel can be seen), the lid structure 30 is configured to extend entirely across the entrance region from side to side and longitudinally. The lid structure 30 also has a profile that is the inverse of that of the ramped surface 24a.

The lid structure not only protects the guide channel from fouling, but is also provides an additional barrier to removal of the engagement portion 14 from the guide channel.

The mooring line 40 can be disconnected by generally performing these steps in reverse. In some embodiments, removal of the engagement portion 14 from the guide channel 22 can be effected without the use of a lifting line, however, under the action of the mooring line alone. The longitudinal channel allows the attachment portion 12 in mooring line to swing over or pivot (around the rotational members 140a, 142a) to be oriented generally proximally P in relation to the guide channel, such that the connector structure 10 can be pulled therefrom under the action of the mooring line 40.

As mentioned above, the relative ease and simplicity of connecting and disconnecting the mooring line, which can be controlled substantially or entirely from the surface (by moving the vessel 60, the winch 62 and/or the crane 66) allows for the mooring line to be retrieved and inspected or replaced more quickly, easily and cost effectively. In turn, since these operations are not prohibitively expensive, the mooring line itself need not be required to remain in situ for such prolonged periods and can be of lighter and/or more cost effective construction.

Figure 6:
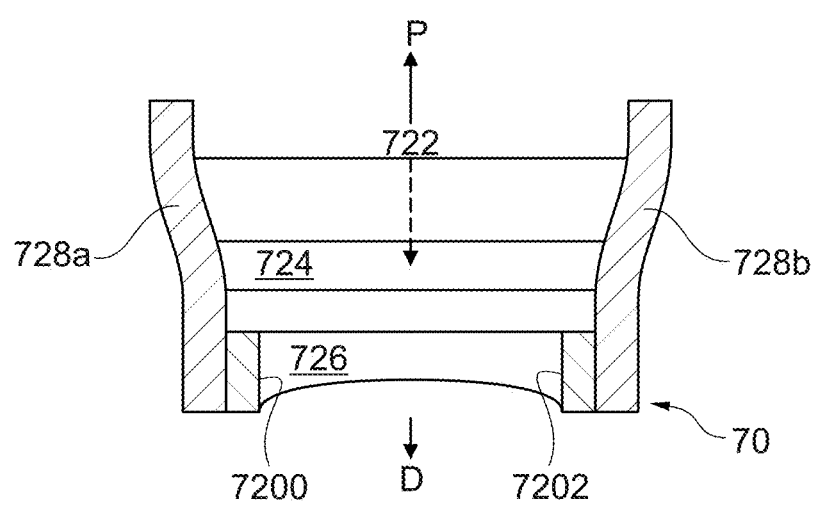
FIG. 6 is a schematic plan view of an alternative anchor structure.

FIG. 6 shows a schematic plan view of another anchor structure 70. In common with anchor structure 20, anchor structure 70 has a guide channel 722. The guide channel 722 extends from an entrance region 724, to a terminal region 726. The terminal region includes receiving formations in the form of recesses or hooks 7200, 7202 which retain the connector structure.

The sides of the channel are defined by side plates 728a and 728b. The side plates are tapered outwardly towards the proximal end of the channel, so as to define an entrance region 724 that is laterally tapered, so as to further assist in guiding the engagement portion of a connector structure towards the terminal region 726 of the channel 722, from within a range of lateral approach trajectories.

Whilst exemplary embodiments have been described herein, these should not be construed as limiting to the modifications and variations possible within the scope of the invention as disclosed herein and recited in the appended claims.

The invention claimed is:

1. A mooring system for mooring a floating vessel, comprising:
    a connector structure comprising an attachment portion for attaching to a mooring line, and an engagement portion; and
    an anchor structure configured to be anchored to a sea bed,
    wherein the anchor structure comprises an open guide channel extending from an entrance region to a terminal region, and sized to accommodate at least the engagement portion of the connector structure,
    wherein a longitudinal opening extends upwardly from the open guide channel, providing access for a mooring line connected to the attachment portion when the engagement portion is in the guide channel,
    wherein, when the engagement portion is engaged with the terminal region of the guide channel, at least the terminal region is configured to support the connector structure, and the engagement portion is retained by the terminal region against movement of the engagement portion out of the guide channel upward from the entrance region.

2. The mooring system of claim 1, wherein the longitudinal opening extends from the guide channel distally of the terminal region.

3. The mooring system of claim 1, wherein the guide channel is defined at least in part defined by a base surface region extending therebetween and oriented generally upwards, at least in the terminal region of the guide channel.

4. The mooring system of claim 1, wherein the guide channel is defined at least in part defined by side surface regions oriented generally towards one another, and wherein the longitudinal opening extends between the side surface regions, along the guide channel.

5. The mooring system of claim 1, wherein the entrance region of the guide channel is configured such that the engagement portion of the connector structure may be lowered into the guide channel.

6. The mooring system of claim 5, wherein at least the entrance region of the guide channel comprises a ramp, oriented to direct the engagement portion, when lowered into the entrance region and onto the ramp, distally along the guide channel towards the terminal region.

7. The mooring system of claim 1, wherein the entrance region is configured to receive the engagement portion from within a range of approach trajectories, wherein the guide channel defines a longitudinal plane of symmetry of symmetry and a range of lateral approach trajectories in relation to the longitudinal plane of symmetry is accommodated by a laterally tapered entrance region.

8. The mooring system of claim 1, wherein the terminal region of the guide channel comprises at least one receiving formation for receiving and engaging, optionally cooperatively, with the engagement portion of the connector structure.

9. The mooring system of claim 8, wherein the guide channel is defined at least in part by side surface regions oriented generally towards one another, and a base surface region extending therebetween and oriented generally upwards and wherein a distal part of one or both side surface region defines a said receiving formation.

10. The mooring system of claim 8, wherein the engagement portion of the connector structure comprises an engagement formation, corresponding to the or each said receiving formation, and wherein the or each engagement formation comprises a rotatable element.

11. The mooring system of claim 1, wherein attachment portion is adapted to facilitate lateral motion vertical motion or both lateral and vertical motion of the mooring line attached thereto.

12. The mooring system of claim 1, further comprising a lid structure, sized to be positioned in and block the entrance portion of the guide channel.

13. A method of connecting a mooring line to the sea bed, the method comprising:
providing a connector structure having an attachment portion attached to a mooring line, and an engagement portion; and an anchor structure anchored to a sea bed, wherein the anchor structure comprises an open guide channel sized to accommodate at least the engagement portion of the connector structure, and the longitudinal opening extends upwardly from the open guide channel;
lowering the engagement portion of the connector structure into an entrance region of the guide channel, or lowering the engagement portion adjacent to an entrance region of the guide channel and moving the engagement portion generally horizontally into the entrance region;
moving the engagement portion distally along the guide channel from the entrance region to a terminal region of the guide channel;
engaging the engagement portion of the connector structure with the terminal region of the guide channel such that the terminal region retains the engagement portion against movement of the engagement portion upward from the entrance region; and is configured to support the connector structure; and
extending the mooring line from the attachment portion in a direction in relation to the guide channel generally upwardly or distally away from the entrance region.

14. The method of claim 13, comprising lowering the connector structure through the water column suspended, at least in part, from a lifting line or from the mooring line.

15. The method of claim 14, wherein movement of the engagement portion into the entrance region and along the guide channel to the terminal region is effected by way of the mooring line and/or the lifting line, controlled from at or above the water surface.

16. The method of claim 13, wherein the mooring line is extended distally away from the entrance region before, during or after movement of the engagement portion along the guide channel.

17. The method of claim 13, comprising lowering the engagement portion onto a ramped entrance region, and wherein the ramp deflects the engagement portion towards the terminal region of the guide channel.

18. The method of claim 13, comprising inserting a lid structure into the entrance region.

19. The method of claim 18 comprising removing the lid structure from the entrance region.

20. A method of disconnecting a mooring line, comprising:
providing a connector structure having an attachment portion attached to a mooring line, and an engagement portion, and an anchor structure anchored to a sea bed, wherein the anchor structure comprises an open guide channel having a the longitudinal opening extending upwardly from the open guide channel,
wherein the engagement portion is engaged with a terminal region of the guide channel such that the terminal region retains the engagement portion against movement of the engagement portion upward from the entrance region and is configured to support the connector structure; and wherein the mooring line extends from the attachment portion in a direction in relation to the guide channel generally upwardly or distally away from an entrance region of the guide channel,
wherein the method comprises:
moving the engagement portion proximally along the guide channel from the terminal region to the entrance region of the guide channel; and
lifting the engagement portion of the connector structure out of the entrance region of the guide channel, or moving the engagement portion generally horizontally out of the entrance region.

* * * * *